US008644383B2

(12) United States Patent
Lu et al.

(10) Patent No.: US 8,644,383 B2
(45) Date of Patent: Feb. 4, 2014

(54) MEAN ABSOLUTE DIFFERENCE PREDICTION FOR VIDEO ENCODING RATE CONTROL

(75) Inventors: Mei-Hsuan Lu, Redmond, WA (US); Tin Qian, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 13/044,630

(22) Filed: Mar. 10, 2011

(65) Prior Publication Data

US 2012/0230400 A1 Sep. 13, 2012

(51) Int. Cl.
*H04N 13/00* (2006.01)
(52) U.S. Cl.
USPC .................................................. 375/240.12
(58) Field of Classification Search
USPC ................................................. 375/240–242
See application file for complete search history.

(56) References Cited

U.S. PATENT DOCUMENTS

| | | | |
|---|---|---|---|
| 6,804,294 B1 * | 10/2004 | Hartung et al. ............... | 375/240 |
| 6,963,931 B2 * | 11/2005 | Bunn et al. ................... | 709/246 |
| 7,697,608 B2 | 4/2010 | Lee ............................... | 375/240.03 |
| 7,773,672 B2 * | 8/2010 | Prieto et al. .................. | 375/240.03 |
| 2004/0165664 A1 * | 8/2004 | Karczewicz et al. ......... | 375/240.16 |
| 2005/0002458 A1 | 1/2005 | Bruls et al. ................... | 375/240.21 |
| 2005/0152453 A1 * | 7/2005 | Lee et al. ...................... | 375/240.16 |
| 2006/0171456 A1 * | 8/2006 | Kwon ............................ | 375/240.03 |
| 2007/0104272 A1 | 5/2007 | He et al. ........................ | 375/240.12 |
| 2007/0116126 A1 | 5/2007 | Haskell et al. ............... | 375/240.21 |
| 2007/0217511 A1 * | 9/2007 | Li et al. ........................ | 375/240.16 |
| 2007/0263720 A1 * | 11/2007 | He ................................. | 375/240.03 |
| 2008/0292005 A1 * | 11/2008 | Xu et al. ....................... | 375/240.28 |
| 2009/0022218 A1 * | 1/2009 | Kim et al. ..................... | 375/240.03 |
| 2010/0020886 A1 * | 1/2010 | Raveendran et al. ........ | 375/240.27 |
| 2010/0061448 A1 * | 3/2010 | Zhou et al. ................... | 375/240.03 |
| 2010/0189183 A1 | 7/2010 | Gu et al. ....................... | 375/240.28 |

OTHER PUBLICATIONS

Li, Z., et al.; "*Proposed Draft of Adaptive Rate Control*"; JVT-H017, 8th Meeting: Geneva, May 2003.
Liu, Y., et al.; "*Rate Control of H.264/AVC Scalable Extension*"; IEEE Transactions on Circuits and Systems for Video Technology, vol. 18, No. 1, Jan. 2008; 6 pgs.
Yi, X., et al.; "*Rate Control Using Enhanced Frame Complexity Measure for H.264 Video*"; Department of Computer Engineering, Santa Clara University, CA USA; SIPS 2004; Oct. 2004; 6 pgs.
PixelTools; "*Rate Control and H.264*"; accessed Dec. 27, 2010, at http://www.pixeltools.com/rate_control_paper.html#qua; 5 pgs.

* cited by examiner

*Primary Examiner* — Dave Czekaj
*Assistant Examiner* — Md Haque
(74) *Attorney, Agent, or Firm* — Merchant & Gould

(57) ABSTRACT

Mean absolute difference (MAD) prediction for video encoding may be provided. Upon receiving a video stream comprising a plurality of quality layers, a first quantization parameter (QP) may be selected for a first frame of the video stream according to a second QP associated with a second frame and a third QP associated with a third frame. The first frame may then be encoded according to the selected first QP.

20 Claims, 4 Drawing Sheets

MEAN ABSOLUTE DIFFERENCE PREDICTION FOR VIDEO ENCODING RATE CONTROL

BACKGROUND

Mean Absolute Difference (MAD) may be used as an index for video coding complexity in an H.264 rate control model. In conventional systems, MAD is predicted by a linear regression model using the actual MAD of the previous stored frames. For bitstreams coded with temporal and quality scalability, such as the Annex G extension of H.264 of Scalable Video Coding (SVC), it may be difficult to select which regressor should be used to achieve accurate prediction of the current MAD. In some situations, the inaccuracy of the MAD can lead to inappropriate selection of a Quantization Parameter (QP), resulting in a poor rate control performance.

SUMMARY

MAD prediction for video encoding rate control may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Mean absolute difference (MAD) prediction for video encoding may be provided. Upon receiving a video stream comprising a plurality of quality layers, a first quantization parameter (QP) may be selected for a first frame of the video stream according to a second QP associated with a second frame and a third QP associated with a third frame. The first frame may then be encoded according to the selected first QP.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
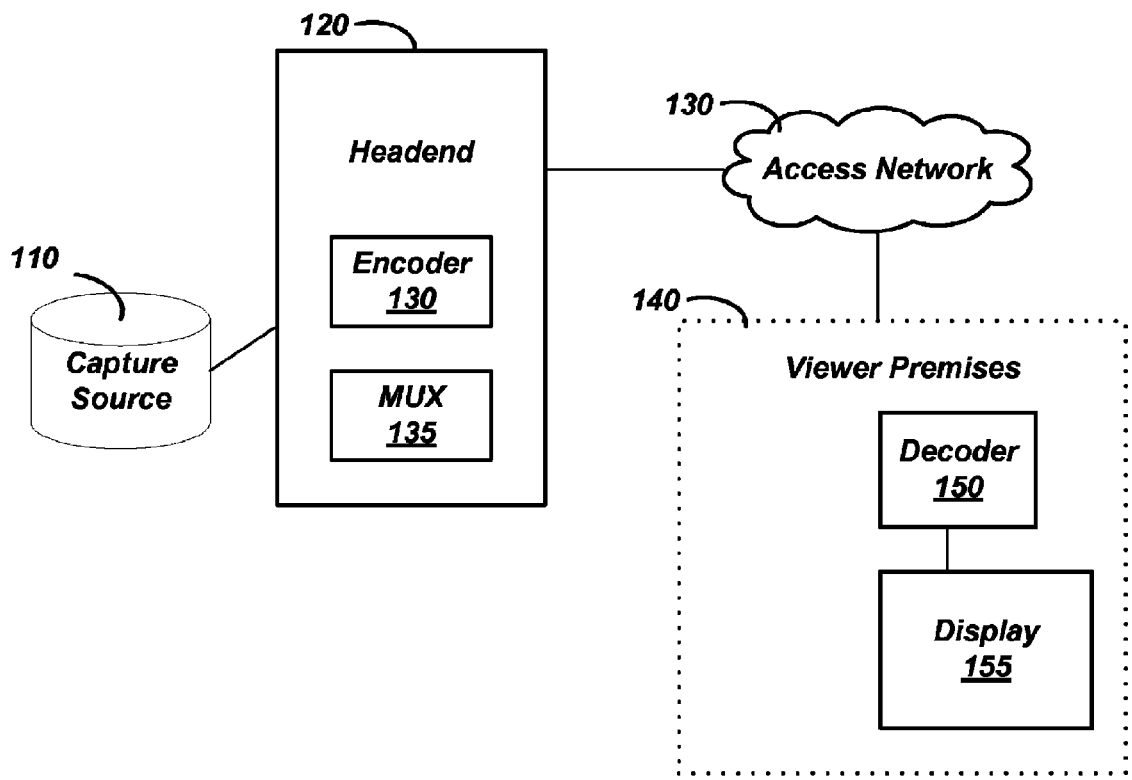
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Mean Absolute Difference (MAD) prediction for video encoding rate control may be provided. Consistent with embodiments of the present invention, two regressors may be used in a single linear regression model. The first regressor may comprise the MAD of a closest frame to the current frame to be encoded across higher, lower, or current temporal layers. The second regressor may comprise the MAD of a closest frame with respect to rate distortion (RD) characteristics. The predicted MAD according to the two regressors may then be used by a quadratic rate-quantizer model to decide an appropriate quantization parameter (QP) for the encoding of the current frame.

FIG. 1 is a block diagram of an operating environment 100 comprising a capture source 110 and a network headend 120 comprising at least a video encoder 130 and a channel multiplexer 135. Capture source 110 may comprise, for example, a real-time video capture device such as a video camera, a video conferencing server, and/or a live video stream provided via a provider network (e.g., a fiber and/or satellite network). Headend 120 may be coupled to an access network 130, such as a hybrid-fiber coax (HFC) cable television network, that may be further connected to a viewer premises 140 comprising a video decoder 150 coupled to a display 155. Consistent with embodiments of the invention, other operating environments may be used to provide the systems and methods described herein. For example, a server coupled to a public network such as the Internet may be operative to encode videos using MAD prediction for provision to users associated with decoding capable computing devices coupled to the network.

Figure 2:
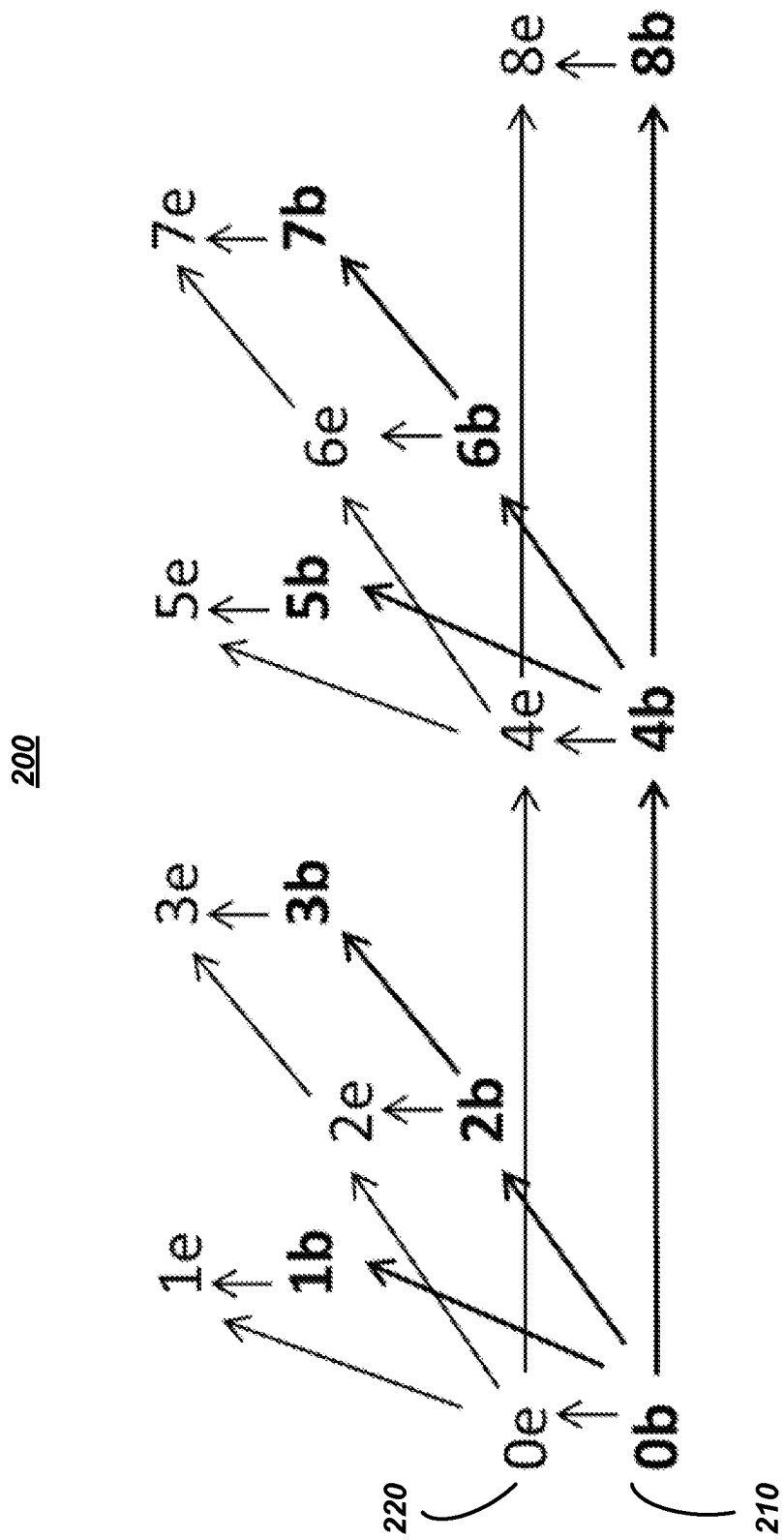
FIG. 2 is a diagram illustrating an SVC bitstream.

FIG. 2 is a diagram illustrating a scalable video coding (SVC) bitstream 200. Bitstream 200 may comprise two layers: a base layer 210 and an enhancement layer 220. Consistent with embodiments of the invention, SVC bitstreams may comprise multiple quality enhancement layers in addition to base layer 210. Consistent with embodiments of the invention, base layer 210 may comprise multiple temporal layers. The bitstream may comprise a plurality of frames associated with each layer, each of which is identified by a number indicating a temporal position of the frame and a letter indicating whether the frame is associated with base layer 210 (i.e., plurality of frames Xb) or enhancement layer 220 (i.e., plurality of frames Xe).

FIG. 2 further illustrates corresponding regressors for some frames in bitstream 200. For example, video encoder 130 may predict a MAD for each frame that may be used to calculate an appropriate quantization parameter (QP). The QP may, in conjunction with the data size of the frame, be used to control the transmission rate of bitstream 200 based on a bandwidth constraint. The QP may comprise a value ranging from 0-51, with lower values resulting in a larger data size for the resulting encoded frame and a concurrently higher quality for that frame, while higher QP values result in a smaller data size and a lower quality.

To predict the MAD for the frame to be encoded, video encoder 130 may calculate MADs for two other frames of bitstream 200 and use those as regressors in a linear regression model. The first regressor, $MAD_{Temp}$ may comprise the MAD of the closest temporal frame across higher, lower, or current temporal layers. For base layer 210, for example, this may comprise the previous frame in the highest frame rate layer. For enhancement layer 220, this may comprise the corresponding base layer 210 frame in the same temporal layer. This regressor may allow the capture of abrupt changes in a hierarchical prediction sequence.

The second regressor, $MAD_{RDC}$, may comprise the MAD of the closest frame with similar rate distortion (RD) characteristics. The RD characteristics of a frame may be functions of that frame's QP and the QP of its reference frame. The similarity of RD characteristics between frames i and j, where QP(i) is denoted as the QP of frame i and Ref(i) as the reference frame of frame i is defined in Equation 1, below. Table 1, also below, shows QPs that may be used in Equation 1 to calculate values for $MAD_{RDC}$.

$$\frac{1}{|QP(i) - QP(j)| + ||QP(i) - QP(Ref(i))| - |QP(j) - QP(Ref(j))||} \quad \text{Equation 1}$$

TABLE 1

| X  | 0   | 1    | 2    | 3    | 4   | 5    | 6    | 7    |
|----|-----|------|------|------|-----|------|------|------|
| Xb | K   | K+5  | K+4  | K+5  | K   | K+5  | K+4  | K+5  |
| Xe | K+6 | K+11 | K+10 | K+11 | K+6 | K+11 | K+10 | K+11 |

Table 2, below, shows example regressors for a second Group of Pictures (GOP) interval of bitstream 200.

TABLE 2

|             | 5b | 5e | 6b | 6e | 7b | 7e | 8b | 8e |
|-------------|----|----|----|----|----|----|----|----|
| $MAD_{Temp}$ | 4b | 5b | 5b | 6b | 6b | 7b | 7b | 8b |
| $MAD_{RDC}$  | 3b | 3e | 5b | 5e | 6b | 6e | 4b | 4e |

A predicted MAD for the frame to be encoded may be computed according to the second order linear regression model shown in Equation 2, below.

$$MAD' = c_2 \cdot MAD_{Temp} + c_1 \cdot MAD_{RDC} + c_0 \quad \text{Equation 2}$$

Figure 3:
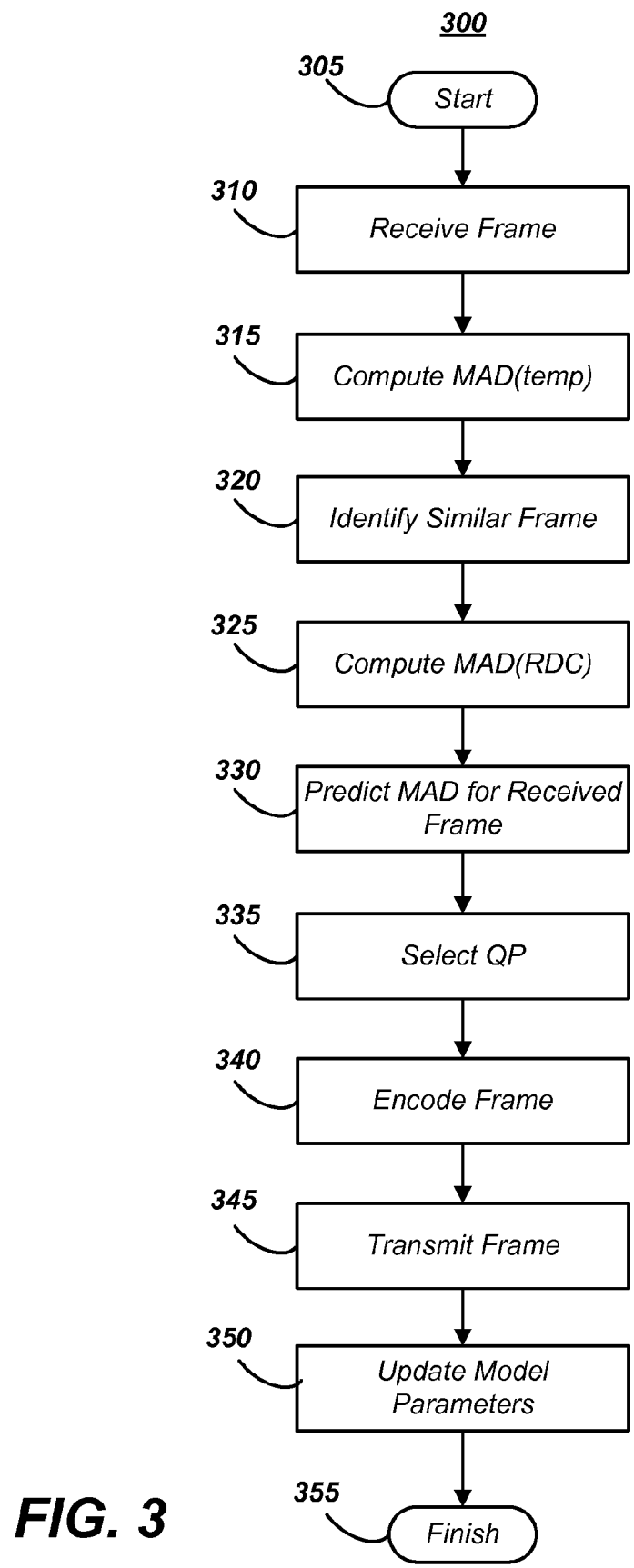
FIG. 3 is a flow chart of a method for providing MAD prediction for video encoding.

FIG. 3 is a flow chart setting forth the general stages involved in a method 300 consistent with an embodiment of the invention for providing Mean Absolute Difference (MAD) prediction for video coding. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may receive a current frame for encoding. For example, the current frame may comprise a frame associated with a scalable video coding (SVC) bitstream. The SVC bitstream may comprise a plurality of layers comprising a base layer and at least one quality enhancement layer. The base layer may comprise one and/or more temporal layers.

Method 300 may then advance to stage 315 where computing device 400 may compute a first mean absolute difference (MAD) of a first frame. For example, where the current frame comprises frame 5b of bitstream 200, encoder 130 may compute a regressor value for the MAD of frame 4b of bitstream 200. Consistent with embodiments of the invention, the first frame may comprise a temporally previous frame of the current frame (e.g., the immediately preceding frame associated with the same layer as the current frame).

Method 300 may then advance to stage 320 where computing device 400 may identify a second frame comprising a similar rate distortion characteristic of the current frame. For example, where the current frame comprises frame 5b of bitstream 200, encoder 130 may compute a regessor value for the MAD of frame 3b of bitstream 200. Encoder 130 may compute a rate distortion for the current frame and for a plurality of other frames of bitstream 200 and determine which of the plurality of other frames comprises a rate distortion characteristic most similar to the current frame. Consistent with embodiments of the invention, the second frame and the current frame may each be associated with a same or a different layer of the plurality of layers.

Method 300 may then advance to stage 325 where computing device 400 may compute a second mean absolute difference (MAD) of the identified second frame.

Method 300 may then advance to stage 330 where computing device 400 may predict a current MAD associated with the current frame according to a second order linear regression model. For example, the first MAD and the second MAD may each comprise regressors associated with the second order linear regression model shown in Equation 2, above.

Method 300 may then advance to stage 335 where computing device 400 may select a quantization parameter (QP) for the current frame according to the predicted current MAD and a bandwidth constraint associated with a transmission network. For example, the quantization parameter may comprise a value between 0 and 51, inclusive.

Method 300 may then advance to stage 340 where computing device 400 may encode the current frame according to the selected quantization parameter according to the H.264 video coding standard. The encoded frame may, based on the selected QP, comprise a size consistent with a desired transmission rate for the bitstream.

Method 300 may then advance to stage 345 where computing device 400 may transmit the encoded frame over a transmission network. For example, headend 120 may transmit the encoded frame over access network 130 that may comprise a hybrid-fiber coax (HFC) cable television network and/or an Internet Protocol (IP) network.

Method 300 may then advance to stage 350 where computing device 400 may update the linear model parameters. For example, values c0, c1 and c2 from Equation 2 may be updated according to the actual MAD computed from the encoded frame. The model parameters may be updated after encoding each frame because the statistics of a nonstationary video sequence may change with time. Method 300 may then end at stage 355

An embodiment consistent with the invention may comprise a system for providing mean absolute difference prediction in a video encoder. The system may comprise a memory storage and a processing unit coupled to the memory storage. The processing unit may be operative to receive a video stream comprising a plurality of quality layers, select a first quantization parameter (QP) for a first frame of the video stream according to a second QP associated with a second frame and a third QP associated with a third frame, and encode the first frame according to the predicted first QP. The video stream may comprise, for example, a scalable video coding (SVC) bitstream comprising a base layer and at least one enhancement layer.

Being operative to select the quantization parameter for the first frame may comprise the processing unit being operative to identify the second frame according to a similarity between a first rate distortion characteristic associated with the first frame and a second rate distortion characteristic associated with the second frame and identify the third frame as a closest previous temporal frame of the first frame. The first, second, and third frames may be associated with the same and/or different layers of the bitstream. The processing unit may be operative to compute a Mean Absolute Difference (MAD) of the second and third frames and predict a MAD of the first frame according to a linear regression model, wherein the MAD of the second frame and the MAD of the third frame comprise regressor associated with the linear regression model. The first QP may then be selected according to the predicted MAD of the first frame and a bandwidth constraint associated with a transmission network.

Another embodiment consistent with the invention may comprise a system for providing mean absolute difference prediction in a video encoder. The system may comprise a memory storage and a processing unit coupled to the memory storage. The processing unit may be operative to receive a plurality of video frames associated with a scalable video coding (SVC) bitstream comprising a plurality of layers, identify an immediately previous temporal frame to a current frame, identify a similar frame to the current frame, predict a mean absolute difference (MAD) of the current frame according to a first MAD associated with the immediately previous temporal frame and a second MAD associated with the similar frame, and encode the current frame according to the predicted MAD. Being operative to identify the similar frame may comprise the processing unit being operative to compute a rate distortion characteristic of each of a subset of the plurality of video frames and compare the rate distortion characteristic of each of the subset of the plurality of video frames to a current rate distortion characteristic of the current frame. The processing unit may be further operative to identify the similar frame as a frame of the subset of the plurality of video frames comprising a rate distortion characteristic similarity measure greater than or equal to 0.25 relative to the current frame. The immediately previous temporal frame may be associated with a different layer of the plurality of layers than the current frame. The processing unit may be further operative to select a quantization parameter (QP) of the current frame according to a bandwidth constraint and the predicted MAD of the current frame. The processing unit may be further operative to transmit the encoded frame over a network such as a hybrid-fiber coax (HFC) cable television network and/or an Internet Protocol (IP) network.

Yet another embodiment consistent with the invention may comprise a system for providing mean absolute difference prediction in a video encoder. The system may comprise a memory storage and a processing unit coupled to the memory storage. The processing unit may be operative to receive a current frame for encoding, wherein the current frame is associated with a scalable video coding (SVC) bitstream comprising a plurality of layers and wherein the plurality of layers comprises a base layer and at least one enhancement layer, compute a first mean absolute difference (MAD) of a first frame, wherein the first frame comprises a temporally previous frame of the current frame, identify a second frame comprising a similar rate distortion characteristic of the current frame, wherein the second frame and the current frame are each associated with a same layer of the plurality of layers, compute a second mean absolute difference (MAD) of the second frame, predict a current MAD associated with the current frame according to a second order linear regression model, wherein the first MAD and the second MAD each comprise regressors associated with the second order linear regression model, select a quantization parameter for the current frame according to the predicted current MAD and a bandwidth constraint associated with a transmission network, wherein the quantization parameter comprises a value between 0 and 51, inclusive, encode the current frame according to the selected quantization parameter according to the H.264 video coding standard, and transmit the encoded frame over the transmission network.

Figure 4:
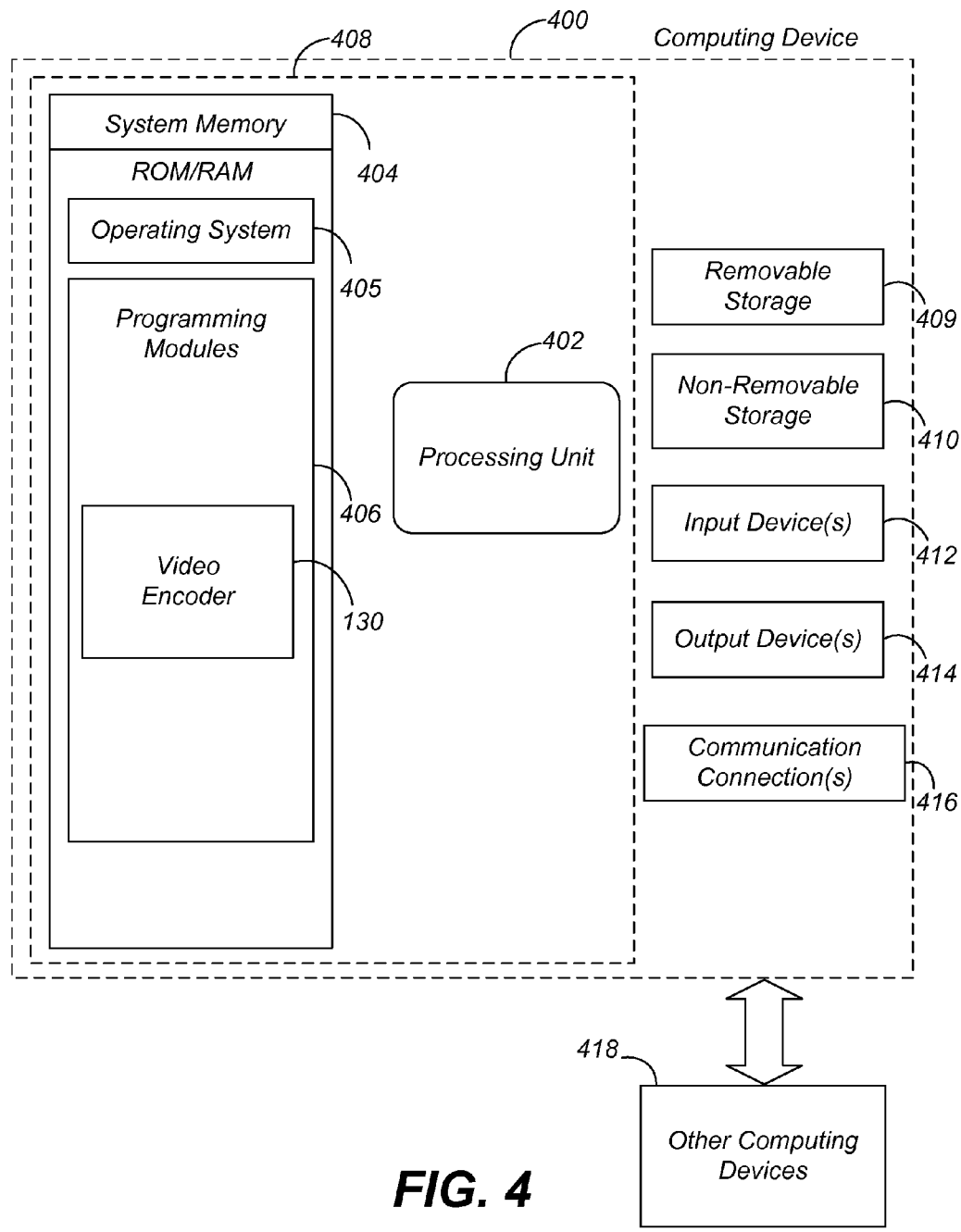
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise operating environment 100 as described above. Methods described in this specification may operate in other environments and are not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include video encoder 130. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., video encoder 130) may perform processes including, for example, one or more of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computer implemented method for providing Mean Absolute Difference (MAD) prediction, the method comprising:
   receiving a video stream comprising a plurality of video frames associated with a scalable video coding (SVC) bitstream comprising a plurality of quality layers;
   identifying an immediately previous temporal frame to a current frame;
   identifying a similar frame that has a similar rate distortion characteristic to the current frame;
   selecting a quantization parameter (QP) for a current frame of the video stream based on predicting a mean absolute difference (MAD) of the first frame according to a second MAD associated with the immediately previous temporal frame and a third MAD associated with the similar frame; and
   encoding the first frame according to the predicted first QP.

2. The method of claim 1, wherein the video stream comprises a scalable video coding (SVC) bitstream.

3. The method of claim 2, wherein the SVC bitstream comprises a base layer and at least one enhancement layer.

4. The method of claim 3, wherein one of the immediately previous temporal frame and the similar frame are associated with the base layer.

5. The method of claim 3, one of the immediately previous temporal frame and the similar frame are associated with the at least one enhancement layer.

6. The method of claim 1, wherein the first frame and the immediately previous temporal frame are each associated with a same quality layer of the plurality of quality layers.

7. The method of claim 1, further comprising predicting a MAD of the first frame according to a linear regression model, wherein the MAD of the immediately previous temporal frame and the MAD of the similar frame comprise regressors associated with the linear regression model.

8. The method of claim 7, wherein the first QP is selected according to the predicted MAD of the first frame and a bandwidth constraint.

9. The method of claim 1, wherein the first frame is encoded according to the H.264 video coding standard.

10. A computer-readable storage device which stores a set of instructions which when executed performs a method for providing mean absolute difference (MAD) prediction in a video encoder, the method executed by the set of instructions comprising:
    receiving a plurality of video frames associated with a scalable video coding (SVC) bitstream comprising a plurality of layers;
    identifying an immediately previous temporal frame to a current frame;
    identifying a similar frame that has a similar rate distortion characteristic to the current frame;
    predicting a mean absolute difference (MAD) of the current frame according to a first MAD associated with the immediately previous temporal frame and a second MAD associated with the similar frame; and
    encoding the current frame according to the predicted MAD.

11. The computer-readable storage device of claim 10, wherein identifying the similar frame comprises:
    computing a rate distortion characteristic of each of a subset of the plurality of video frames; and
    comparing the rate distortion characteristic of each of the subset of the plurality of video frames to a current rate distortion characteristic of the current frame.

12. The computer-readable storage device of claim 11, further comprising identifying the similar frame as a frame of the subset of the plurality of video frames comprising a rate distortion characteristic similarity measure greater than or equal to 0.25 relative to the current frame.

13. The computer-readable storage device of claim 10, wherein the immediately previous temporal frame is associated with a different layer of the plurality of layers than the current frame.

14. The computer-readable storage device of claim 10, further comprising selecting a quantization parameter (QP) of the current frame according to a bandwidth constraint and the predicted MAD of the current frame.

15. The computer-readable storage device of claim 10, further comprising transmitting the encoded frame over a network.

16. The computer-readable storage device of claim 15, wherein the network comprises a hybrid-fiber coax (HFC) cable television network.

17. The computer-readable storage device of claim 15, wherein the network comprises an Internet Protocol (IP) network.

18. A system for providing mean absolute difference (MAD) prediction in a video encoder, the system comprising:
    a memory storage; and
    a processing unit coupled to the memory storage, wherein the processing unit is operative to:
       receive a plurality of video frames associated with a scalable video coding (SVC) bitstream comprising a plurality of layers;
       identify an immediately previous temporal frame to a current frame;
       identify a similar frame that has a similar rate distortion characteristic to the current frame;
       predict a mean absolute difference (MAD) of the current frame according to a first MAD associated with the immediately previous temporal frame and a second MAD associated with the similar frame; and
       encode the current frame according to the predicted MAD.

19. The system of claim 18, wherein the processing unit is further is operative to:
    compute a rate distortion characteristic of each of a subset of the plurality of video frames; and
    compare the rate distortion characteristic of each of the subset of the plurality of video frames to a current rate distortion characteristic of the current frame.

20. The system of claim 19, wherein the processing unit is further is operative to:
    identify the similar frame as a frame of the subset of the plurality of video frames comprising a rate distortion characteristic similarity measure greater than or equal to 0.25 relative to the current frame.

* * * * *